United States Patent
Watanabe

(10) Patent No.: US 10,207,734 B2
(45) Date of Patent: Feb. 19, 2019

(54) BEHAVIOR CONTROL APPARATUS FOR VEHICLE

(71) Applicant: TOYOTA JIDOSHA KABUSHIKI KAISHA, Toyota-shi, Aichi-ken (JP)

(72) Inventor: Ryochi Watanabe, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 44 days.

(21) Appl. No.: 15/617,295

(22) Filed: Jun. 8, 2017

(65) Prior Publication Data
US 2017/0355397 A1 Dec. 14, 2017

(30) Foreign Application Priority Data

Jun. 9, 2016 (JP) ................................. 2016-115607

(51) Int. Cl.
| | |
|---|---|
| *B62D 3/12* | (2006.01) |
| *B60D 6/00* | (2006.01) |
| *B60W 30/00* | (2006.01) |
| *B60T 8/1755* | (2006.01) |
| *B60W 30/045* | (2012.01) |

(52) U.S. Cl.
CPC .......... *B62D 6/003* (2013.01); *B60T 8/17551* (2013.01); *B60W 30/045* (2013.01); *B62D 3/12* (2013.01); *B60T 2250/06* (2013.01)

(58) Field of Classification Search
CPC ... B62D 3/00; B62D 3/12; B62D 6/00; B62D 6/003; B60W 30/00; B60W 30/045
See application file for complete search history.

(56) References Cited

U.S. PATENT DOCUMENTS

| | | | | |
|---|---|---|---|---|
| 6,152,254 A * | 11/2000 | Phillips | ................ | B62D 5/0463 180/421 |
| 6,363,309 B1 | 3/2002 | Irie et al. | | |
| 7,206,702 B2 * | 4/2007 | Isono | ................ | B60T 8/172 701/70 |
| 7,295,908 B2 * | 11/2007 | Goto | ................ | B62D 6/002 180/443 |
| 7,810,608 B2 * | 10/2010 | Goto | ................ | B62D 6/008 180/402 |
| 9,174,675 B2 * | 11/2015 | Watanabe | .......... | B62D 15/0245 |

(Continued)

FOREIGN PATENT DOCUMENTS

| | | |
|---|---|---|
| JP | 7-69230 A | 3/1995 |
| JP | 11-34701 A | 2/1999 |

(Continued)

*Primary Examiner* — Yonel Beaulieu
(74) *Attorney, Agent, or Firm* — Sughrue Mion, PLLC

(57) ABSTRACT

A behavior control apparatus for a vehicle, comprising a control unit that controls braking/driving forces of wheels so that the magnitude of a deviation between a steering angle and a steering angle conversion value of a yaw rate decreases when it is determined that the deviation exceeds a threshold value in magnitude and the vehicle is in an understeer state; the vehicle has a steering device including a variable gear ratio type rack bar; and, when the sign of the steering angle is the same as the sign of the offset amount and the zero point offset amount exceeds a reference value in magnitude, the control device corrects at least one of the threshold value and the magnitude of the deviation according to the steering angle and the zero point offset amount so that it becomes difficult to determine that the magnitude of the deviation exceeds the threshold value.

8 Claims, 9 Drawing Sheets

(56) References Cited

U.S. PATENT DOCUMENTS

| | | | | |
|---|---|---|---|---|
| 9,561,822 B2* | 2/2017 | Taniguchi | | B62D 15/025 |
| 2006/0009894 A1* | 1/2006 | Goto | | B62D 6/002 |
| | | | | 701/41 |
| 2006/0259225 A1* | 11/2006 | Ono | | B60G 17/016 |
| | | | | 701/82 |
| 2007/0192003 A1* | 8/2007 | Hashiba | | B60G 17/018 |
| | | | | 701/37 |
| 2008/0027601 A1* | 1/2008 | Sewaki | | G01C 19/42 |
| | | | | 701/31.4 |
| 2008/0086248 A1* | 4/2008 | Lu | | B60T 8/171 |
| | | | | 701/41 |
| 2008/0142293 A1* | 6/2008 | Goto | | B62D 6/003 |
| | | | | 180/446 |
| 2010/0030428 A1* | 2/2010 | Gartner | | B62D 15/0245 |
| | | | | 701/42 |
| 2010/0211271 A1* | 8/2010 | Yasutake | | B60T 8/1755 |
| | | | | 701/48 |
| 2014/0136053 A1* | 5/2014 | Watanabe | | B62D 15/0245 |
| | | | | 701/41 |
| 2014/0142810 A1* | 5/2014 | Watanabe | | B62D 5/0481 |
| | | | | 701/41 |
| 2014/0311817 A1 | 10/2014 | Kita et al. | | |
| 2016/0016581 A1* | 1/2016 | Yokota | | B60W 10/04 |
| | | | | 701/41 |
| 2016/0016591 A1* | 1/2016 | Yokota | | B60W 40/114 |
| | | | | 701/34.4 |

FOREIGN PATENT DOCUMENTS

| | | |
|---|---|---|
| JP | 2004-276734 A | 10/2004 |
| JP | 2014/210495 A | 11/2014 |

* cited by examiner

BEHAVIOR CONTROL APPARATUS FOR VEHICLE

CROSS-REFERENCE TO RELATED APPLICATION

The disclosure of Japanese Patent Application NO. JP2016-115607 filed on Jun. 9, 2016 is incorporated by reference in its entirety.

BACKGROUND

1. Technical Field

The present disclosure relates to a behavior control apparatus for a vehicle such as an automobile.

2. Description of the Related Art

A behavior control apparatus that performs an understeer control for reducing a degree of understeer state by controlling braking/driving forces of wheels in a vehicle such as an automobile when the vehicle is in an understeer state is known. In a behavior control apparatus performing an understeer control, for example, as described in Japanese Patent Application Laid-open No. H07-69230, it is determined whether or not a vehicle is in an understeer state by determining whether or not a magnitude of a deviation between a target yaw rate of a vehicle based on a steering angle and a vehicle speed and a detected actual yaw rate of the vehicle is equal to or larger than a threshold value. It is also known that an understeer state of a vehicle is determined based on a deviation between a steering angle and a value (a steering angle conversion value of a yaw rate) obtained by converting a detected actual yaw rate of the vehicle into a steering angle.

As is well known, in a steering apparatus for a vehicle such as an automobile, rotation of a steering wheel operated by a driver is transmitted to a rack and pinion device via a steering shaft, and is converted into linear motion of the rack bar in the vehicle lateral direction by the rack and pinion device. The linear motion of the rack bar is transmitted to the wheels via tie rods and knuckle arms, whereby the wheels are steered. The rack and pinion device includes a rack bar that meshes with a pinion coupled to the steering shaft.

The ratio of a steered angle of wheels to a rotation angle of the steering wheel, that is, a steering transmission ratio (a reverse value of a steering gear ratio) is preferably larger in a range where a magnitude of a steering angle is large than in a range where a magnitude of a steering angle is small. Therefore, a so-called variable gear ratio type rack bar may be used in which a pitch of the rack teeth in a region in the vicinity of the both ends corresponding to a range where a magnitude of a steering angle is large is larger than a pitch of the rack teeth in the other region corresponding to a range where a magnitude of a steering angle is small. According to the variable gear ratio type rack bar, it is possible to increase the steering transmission ratio in a range where a magnitude of the steering angle is large as compared with a general rack bar in which a pitch of the rack teeth is constant over the entire region.

In a vehicle in which a rack bar is a variable gear ratio type rack bar, when an understeer state of a vehicle is determined using a certain threshold value based on a deviation between a steering angle and a steering angle conversion value of a yaw rate, erroneous determination tends to occur in a range where a magnitude of a steering angle is large, that is, in a range where a steering transmission ratio is large.

In a yaw rate sensor for detecting a yaw rate of a vehicle, a so-called zero point offset may occur where a detected yaw rate becomes a value other than 0 even when the vehicle is in a straight traveling state. When a zero point offset occurs in a yaw rate sensor, a steering angle conversion value of a yaw rate becomes a value different from a value obtained by converting an actual yaw rate of the vehicle to a steering angle. Therefore, as will be described in detail later, it is determined that the vehicle is in an understeer state although the vehicle is not in an understeer state, the braking/driving forces of the wheels are controlled unnecessarily, and a driver may feel annoyance. Conversely, it is determined that the vehicle is not in an understeer state despite the vehicle being in an understeer state, and required control of braking/driving forces of the wheels may not be executed.

Note that a situation where it is determined that a vehicle is not in an understeer state despite the vehicle being in an understeer state and the necessary braking/driving force control of the wheels is not executed is the same as the situation in a vehicle in which the understeer control is not performed. Since a driver tries to deal with this situation by increasing steering, he or she does not feel annoyance due to this situation.

SUMMARY

It is therefore an object of the present disclosure to reduce a possibility that the determination of an understeer state of the vehicle, which is performed based on a deviation between a steering angle and a steering angle conversion value of a yaw rate is erroneously made in a range where a steering angle is large in a vehicle in which a variable gear ratio type rack bar is used.

According to the present disclosure, a behavior control apparatus for a vehicle is provided which comprises a yaw rate sensor that detects a yaw rate of the vehicle, a steering angle sensor that is provided in a steering device and detects a steering angle, and a control unit configured to control a behavior of the vehicle; the yaw rate sensor and the steering angle sensor each outputting a positive value for one of the left turning direction and the right turning direction; and the control unit being configured to calculate a steering angle conversion value of a yaw rate based on a yaw rate detected by the yaw rate sensor, and, when it is determined that a magnitude of a deviation between a steering angle detected by the steering angle sensor and a steering angle conversion value exceeds a threshold value and the vehicle is in an understeer state, to control braking/driving forces of wheels so that the magnitude of the deviation decreases.

The steering device includes a rack-and-pinion device having a variable gear ratio type rack bar, and has a steering gear ratio that is smaller in a range where a magnitude of the steering angle exceeds a first reference value than in a range where the magnitude of the steering angle is equal to or less than the first reference value. The control unit is configured to obtain a zero point offset amount of the yaw rate sensor and, assuming that the zero point offset amount takes a positive value when a zero point offset of the yaw rate sensor is an offset in the one turning direction, and when the sign of the steering angle is the same as the sign of the offset amount and the magnitude of the zero point offset amount exceeds a second reference value, to correct at least one of the threshold value and the magnitude of the deviation according to the steering angle and the zero point offset amount so that it becomes difficult to determine that the magnitude of the deviation exceeds the threshold value.

As will be described in detail later, when the signs of a steering angle and a zero point offset amount are the same and a magnitude of the zero point offset amount is large, the magnitude of the threshold value for determining an understeer state is insufficient in a range where a magnitude of the steering angle is large. Therefore, since it is easy to determine that a magnitude of the deviation exceeds the threshold value, there is a high possibility that it is erroneously determined that the vehicle is in an understeer state despite the fact that the vehicle is not actually in an understeer state.

According to the above configuration, when the signs of a steering angle and a zero point offset amount are the same and a magnitude of the zero point offset amount exceeds the second reference value, at least one of the threshold value and the magnitude of the deviation is corrected in accordance with the steering angle and the zero point offset amount so that it is difficult to determine that a magnitude of the deviation exceeds the threshold value.

Consequently, it is difficult to determine that a magnitude of the deviation exceeds the threshold value, which enables to reduce a possibility of erroneously determining that the vehicle is in an understeer state in spite of the fact that the vehicle is not actually in an understeer state. Therefore, it is possible to reduce a possibility that the driver feels troublesome because the braking/driving forces of the wheels are unnecessarily controlled due to erroneous determination that the vehicle is in an understeer state.

It is to be noted that "a steering angle conversion value of a yaw rate" is a value obtained by converting a yaw rate of a vehicle detected by a yaw rate sensor into a steering angle, in other words, a steering angle required for setting the yaw rate of the vehicle to a value detected by the yaw rate sensor. Specifically, a steering angle conversion value of a yaw rate is calculated according to the below-described equation (1).

ASPECT OF THE PRESENT DISCLOSURE

In one embodiment of the present disclosure, the control unit is configured to set a third reference value having a magnitude smaller than the first reference value based on the zero point offset amount for a range of the steering angle having the same sign as the zero point offset amount, and to increasingly correct the threshold value in a range where the magnitude of the steering angle exceeds the third reference value.

According to the above aspect, the third reference value having a magnitude smaller than the first reference value is set based on the zero point offset amount for the steering angle range having the same sign as the zero point offset amount, and the threshold value in a range the magnitude of the steering angle exceeds the third reference value is increasingly corrected. Therefore, while preventing the threshold value from unnecessarily increasing in the range where the magnitude of the steering angle is not more than the third reference value, the threshold value can be increased within a range where the magnitude of the steering angle exceeds the third reference value. Accordingly, while avoiding making it difficult to determine that the vehicle is in an understeer state in the range where the magnitude of the steering angle is not more than the third reference value, it is possible to reduce the possibility that an erroneous determination is made that the vehicle is in an understeer state in the range where the magnitude of the steering angle exceeds the third reference value.

In another aspect of the present disclosure, the control unit is configured to variably set the third reference value based on the zero point offset amount such that a magnitude of a difference between the first reference value and the third reference value increases as the magnitude of the zero point offset amount increases.

As will be described in detail later, the larger the magnitude of the zero point offset amount is, the larger the range of the steering angle where an erroneous determination that the vehicle is in an understeer state is expanded toward 0. According to the above aspect, the magnitude of the difference between the first and the third reference values increases as the magnitude of the zero point offset amount increases, and the magnitude of the third reference value decreases. Consequently, the larger the magnitude of the zero point offset amount is, the larger the range of the steering angle at which the threshold value is increased can be expanded toward 0. Therefore, as compared to where the third reference value is constant irrespective of the magnitude of the zero point offset amount, while effectively avoiding making it difficult to determine that the vehicle is in an understeer state in a range where the magnitude of the steering angle is small, it is possible to effectively reduce the possibility of erroneous determination that the vehicle is in an understeer state in a range where the magnitude of the steering angle is large.

Further, in another aspect of the present disclosure, the control unit is configured to increase an increase amount of the threshold value as a magnitude of a difference between the steering angle and the third reference value increases.

According to the above aspect, the increase amount of the threshold value is increased as the magnitude of the difference between the steering angle and the third reference value is larger. Therefore, while avoiding a sudden change in the threshold value when the steering angle changes above and below the third reference value, the increase amount of the threshold value can be increased as the magnitude of the steering angle becomes larger than the third reference value, the possibility of erroneous determination can appropriately be reduced that the vehicle is in an understeer state according to the magnitude of the steering angle.

Further, in another aspect of the present disclosure, the control unit is configured to set a third reference value having a magnitude smaller than the first reference value based on the zero point offset amount for a range of the steering angle having the same sign as the zero point offset amount, and to decreasingly correct the magnitude of the deviation according to the zero point offset amount so that the magnitude of the deviation in a range where the magnitude of the steering angle exceeds the third reference value becomes small.

According to the above aspect, the third reference value having a magnitude smaller than the first reference value is set based on the zero point offset amount for the steering angle range having the same sign as the zero point offset amount, and the magnitude of the deviation in the range where the magnitude of the steering angle exceeds the third reference value is decreasingly corrected. Therefore, while preventing the magnitude of the deviation from unnecessarily decreasing in the range where the magnitude of the steering angle is equal to or less than the third reference value, the magnitude of the deviation can be reduced in the range where the magnitude of the steering angle exceeds the third reference value. Accordingly, while avoiding making it difficult to determine that the vehicle is in an understeer state in the range where the magnitude of the steering angle is not more than the third reference value, it is possible to reduce the possibility that an erroneous determination is made that the vehicle is in an understeer state in the range where the magnitude of the steering angle exceeds the third reference value.

Furthermore, in another aspect of the present disclosure, the control unit is configured to variably set the third reference value based on the zero point offset amount such that the magnitude of the difference between the first and the third reference values increases as the magnitude of the zero point offset amount increases.

According to the above aspect, the magnitude of the difference between the first and the third reference values increases as the magnitude of the zero point offset amount increases, and the magnitude of the third reference value decreases. Accordingly, the larger the magnitude of the zero point offset amount is, the larger the range of the steering angle where the magnitude of the deviation is decreased can be expanded toward 0. Therefore, as compared to where the third reference value is constant irrespective of the magnitude of the zero point offset amount, while effectively avoiding making it difficult to determine that the vehicle is in an understeer state in a range where the magnitude of the steering angle is small, it is possible to effectively reduce the possibility of erroneous determination that the vehicle is in an understeer state in a range where the magnitude of the steering angle is large.

Further, according to another aspect of the present disclosure, the control unit is configured to increase the magnitude of the decrease amount of the magnitude of the deviation as the magnitude of the difference between the steering angle and the third reference value increases.

According to the above aspect, the magnitude of the magnitude of the magnitude of the deviation is increased as the magnitude of the difference between the steering angle and the third reference value increases. Therefore, while avoiding a sudden change in the threshold value when the steering angle changes above and below the third reference value, the amount of reduction of the magnitude of the deviation can be increased as the magnitude of the steering angle becomes larger than the third reference value, the possibility of erroneous determination can effectively be reduced that the vehicle is in an understeer state.

DETAILED DESCRIPTION

[Principle of the Present Disclosure Adopted in the Embodiments]

Prior to the description of the embodiments, the principle of behavior control in the present disclosure will be described so as to facilitate understanding of the present disclosure.

<Determination of Understeer State Based on Steering Angle and Steering Angle Conversion Value of Yaw Rate>

A steering angle is defined as STR, and a yaw rate of the vehicle is defined as YR. A steering angle conversion value of a yaw rate YR of the vehicle, that is, a value obtained by converting a yaw rate YR into a steering angle is defined as STRY and a deviation (steering angle deviation) between a steering angle STR and a steering angle conversion value STRY is represented by $\Delta$STR (=STR−STRY). It is assumed that a steering angle STR, a yaw rate YR of the vehicle, and a steering angle conversion value STRY are positive values when the vehicle turns left.

Figure 10A:
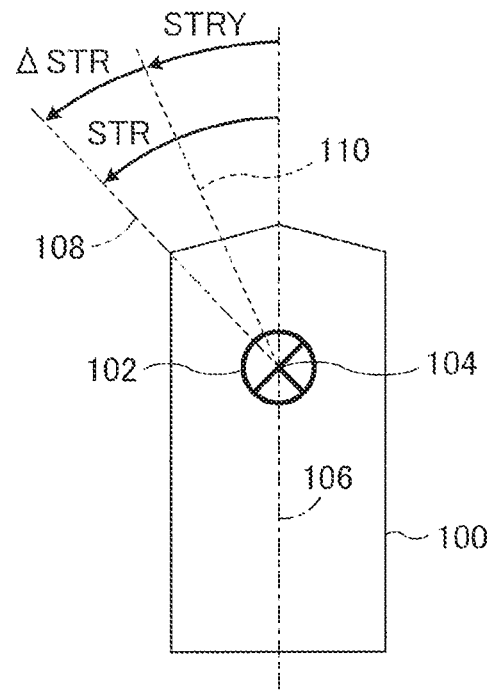
FIGS. 10A and 10B are plan views showing situations in which a vehicle turns to the left and right, respectively in an understeer state.
Figure 10B:
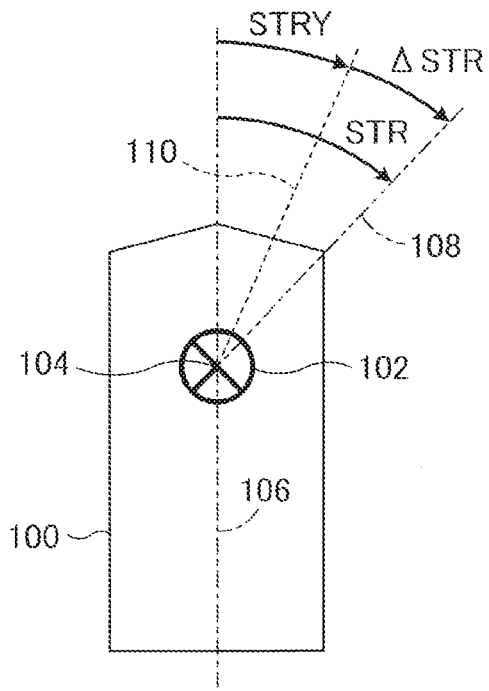

FIGS. 10A and 10B are plan views showing situations where a vehicle 100 turns to the left and right, respectively in an understeer state. In the figures, a steering wheel 102 is shown moved to a center of gravity 104 of the vehicle 100. A one-dot chain line 106 indicates a longitudinal center line of the vehicle 100, a two-dot chain line 108 indicates a direction of a rotation angle from the neutral position of the steering wheel 102, and a broken line 110 indicates a movement direction at the center of gravity 104 of the vehicle 100.

As shown in FIG. 10A, in a situation where the vehicle 100 is turning to the left in an understeer state, a steering angle STR and a steering angle conversion value STRY are positive values, and the steering angle conversion value STRY is smaller than the steering angle STR. Therefore, a steering angle deviation $\Delta$STRs, which is an index value for determining whether or not the vehicle 100 is in an understeer state, is also a positive value, and increases as a degree of the understeer state increases. The above holds regardless of a vehicle speed V.

On the other hand, as shown in FIG. 10B, in a situation where the vehicle 100 turns to the right in an understeer state, a steering angle STR and a steering angle conversion value STRY are negative values, and the steering angle conversion value STRY is larger than the steering angle STR. Therefore, the steering angle deviation $\Delta$STR, which is an index value for determining whether or not the vehicle 100 is in an understeer state, is also a negative value, and the larger the degree of the understeer state is, the larger the magnitude is. This also holds regardless of the vehicle speed V.

Therefore, irrespective of a turning direction of the vehicle and a vehicle speed, the signs of steering angle STR and steering angle conversion value STRY are the same, and by determining whether or not an absolute value of the steering angle deviation ΔSTR exceeds a threshold value ThUS (a positive constant), it can be determined whether or not the vehicle is in an understeer state. Further, the degree of the understeer state of the vehicle can be determined by determining the magnitude of the absolute value of the steering angle deviation ΔSIR.

<Relationship Between Steering Angle and Threshold Value for Determining Understeer State>

Figure 11:
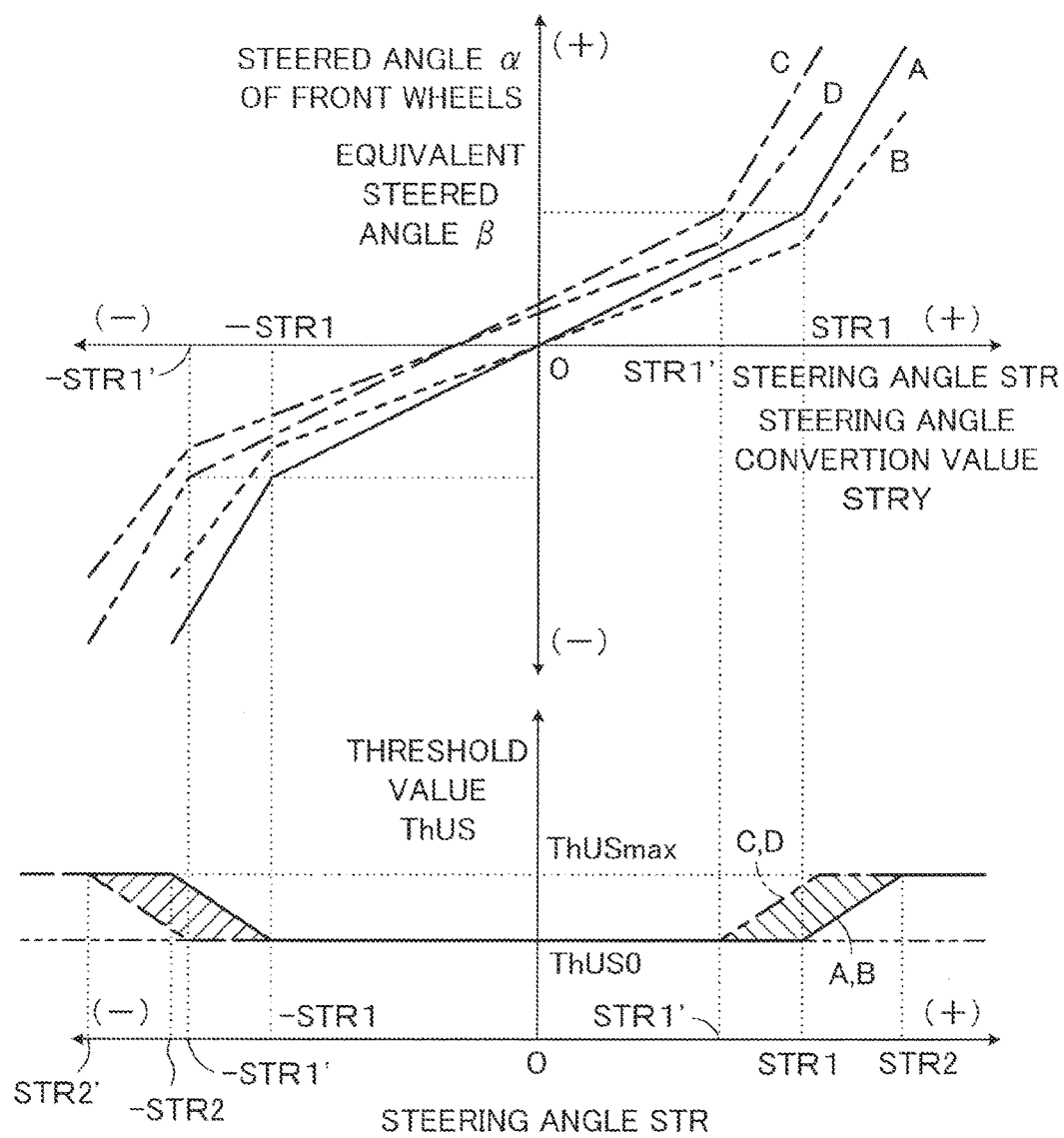
FIG. 11 is a graph showing a relationship between a steering angle STR and a steered angle $\alpha$ of front wheels (upper half) and a relationship between a steering angle STR and an absolute value of a threshold value ThUS for determining an understeer state (lower half), with respect to a case where a zero point offset amount $\Delta$YR is 0 and a positive value.

FIG. 11 is a graph showing a relationship (upper half) between a steering angle STR and a steered angle α of the front wheels as the steerable wheels and a relationship (lower half) between a steering angle STR and an absolute value of the threshold value ThUS for judging the understeer state. In particular, the solid line in the upper half of FIG. 11 shows a relationship between a steering angle STR and a steering angle α of the front wheels (case A) in the case where the vehicle is not in the understeer state and the zero point offset does not occur in the yaw rate sensor.

In a vehicle, in which a rack bar of a steering apparatus of the vehicle is a variable gear ratio type rack bar, a ratio of a rotation angle of the steering wheel to a steered angle α of the front wheel's that is, a steering gear ratio RS is large in a region (steering angle region) where the magnitude of the steering angle STR is larger than the reference value STR1 (positive constant). Therefore, in order to prevent the vehicle from being erroneously determined to be in an understeer state in a large steering angle region, a magnitude of a threshold value ThUS is preferably set to be larger as a magnitude of a steering angle STR is larger in a large steering angle region.

Therefore, the threshold value ThUS is set, for example, as indicated by the solid line in the lower half of FIG. 11. That is, the threshold value ThUS is a constant value (standard value ThUS0) in a region where a magnitude of the steering angle STR is equal to or less than the reference value STR1, that is, in a region where the steering gear ratio RS is large (hereinafter referred to as the "standard region"). In contrast, in the large steering angle region, the threshold value ThUS increases as an absolute value of the steering angle STR increases. In the range where an absolute value of the steering angle STR exceeds a reference value STR2, the threshold value ThUS is a constant value (maximum value ThUSmax).

<When the Vehicle is in an Understeer State and there is No Zero Point Offset (Case B)>

A steered angle of the front wheels when the vehicle travels in a non-understeer state along a trajectory when the vehicle makes travelling in an understeer state is defined as an equivalent steered angle β. Since a magnitude of the equivalent steered angle β is smaller than a magnitude of the tsteered angle α for the same steering angle STR, the relationship between the steering angle STR and the equivalent steered angle β is, for example, the broken line shown in the upper half of FIG. 11. The steering angle deviation ΔSTR is the difference between the values of the solid line and the broken line as viewed along the axis of the steering angle STR (horizontal axis) in the upper half of FIG. 11.

As understood from the comparison between the solid line and the broken line in the upper half of FIG. 11, the slope of the broken line is smaller than the slope of the solid line, but the magnitudes of the steering angle STR at which the inclinations of the solid line and the dashed line change are all the reference value STR1. Therefore, in either of the solid line and the broken line, the range of the steering angle in which the threshold value ThUS needs to be larger than the standard value ThUS0 is a range in which an absolute value of the steering angle is larger than the reference value STR1. Therefore, in determining whether the vehicle is in an understeer state or not, there is no need to correct the magnitude of the threshold value ThUS depending on whether or not a magnitude of the steering angle STR is larger than the reference value STR1.

<When the Vehicle is not in an Understeer State but there is a Positive Zero Point Offset (Case C)>

When the vehicle is not in an understeer state but the yaw rate sensor has a positive zero point offset, a steering angle conversion value STRY is smaller than a steering angle STR. Therefore, a relationship between the steering angle conversion value STRY and the steering angle α of the front wheels is, for example, the relationship shown by the one-dot chain line in the upper half of FIG. 11. It is to be noted that when the vehicle is in an understeer state and there is a positive zero point offset (case D), a relationship between the steering angle conversion value STRY and the equivalent steered angle β is, for example, the relationship indicated by the two-dot chain line in the upper half of FIG. 11.

As shown in the upper half of FIG. 11, a steering angle STR or a steering angle conversion value STRY at which a steering gear ratio RS varies according to the change in the steering angle STR or the steering angle conversion value STRY is STR1' smaller than the reference value STR1 at left turn and −STR1' smaller than the reference value −STR1 at right turn. Therefore, as indicated by hatching diagonally downward to the right in the lower half of FIG. 11, in the range of the steering angle STR from STR1' to STR2, the threshold value ThUS is smaller than the value required to prevent an erroneous determination of an understeer state that is indicated by a one-dot chain line.

Therefore, in order to prevent understeer control from being executed unnecessarily earlier at the time of left turning, the threshold value ThUS is to be increasingly corrected to be a value indicated by a one-dot chain line in a range where the steering angle STR exceeds STR1'. Note that this also applies to the case where the vehicle is in an understeer state and there is a positive zero point offset (case D), that is, the case shown by the two-dot chain line in the upper half of FIG. 11.

On the other hand, at the time of turning to the right, as indicated by hatching falling left in the lower half of FIG. 11, in a range where the steering angle STR is from −STR1 to −STR2', the threshold value ThUS is larger than the value required to prevent erroneous determination of an understeer state that is indicated by a one-dot chain line. Therefore, in the range of the steering angle, even when the understeer control is to be executed, the understeer control may not be executed in some cases. However, the driver preferably attempts to reduce a turning radius of the vehicle by increasing steering in the right turning direction while lowering the vehicle speed. Therefore, a correction for reducing the threshold value ThUS to a value indicated by a one-dot chain line may not be performed.

<When the Vehicle is not in an Understeer State but there is a Negative Zero Point Offset (Case E)>

When the vehicle is not in an understeer state, but there is a negative zero point offset in the yaw rate sensor, a steering angle conversion value STRY has a value larger than a steering angle STR. Therefore, a relationship between the steering angle conversion value STRY and the steered angle α of the front wheels is, for example, the relationship shown by the one-dot chain line in the upper half of FIG. 12. It is to be noted that the vehicle is in a understeer state and there is a negative zero point offset (case F), a relationship between the steering angle conversion value STRY and the equivalent steered angle β is, for example, the relationship indicated by a two-dot chain line in the upper half of FIG. 12.

Figure 12:
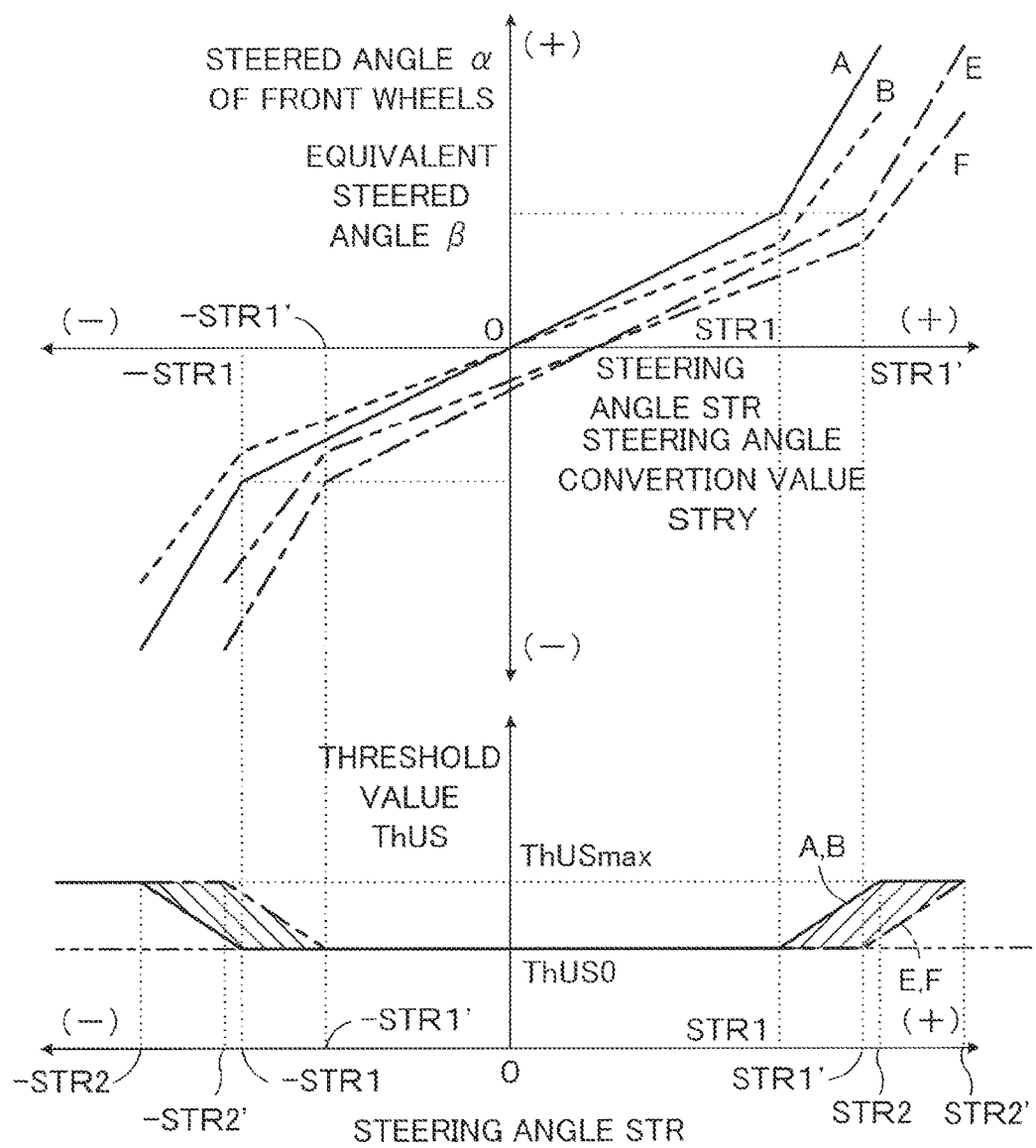
FIG. 12 is a graph showing a relationship between a steering angle STR and a steered angle $\alpha$ of front wheels (upper half) and a relationship between a steering angle STR and an absolute value of a threshold value ThUS for determining an understeer state (lower half), with respect to a case where a zero point offset amount $\Delta$YR is 0 and a negative value.

As shown in the upper half of FIG. 12, a steering angle STR or a steering angle conversion value STRY at which the steering gear ratio RS varies according to the change of the steering angle STR or the steering angle conversion value STRY is STR1' larger than the reference value STR1 at left turn and −STR1' larger than the reference value −STR1 at right turn. Therefore, as indicated by hatching falling right in the lower half of FIG. 12, in the range of the steering angle STR from −STR1' to −STR2, the threshold value ThUS is smaller than the value required to prevent the determination of an understeer state that is indicated by a one-dot chain line.

Therefore, in order to prevent the understeer control from being executed unnecessarily earlier at the time of the left turning, the threshold value ThUS is to be increasingly corrected to a value indicated by a one-dot chain line in a range where the steering angle STR is smaller than −STR1'. Note that this also applies to the case where the vehicle is in an understeer state and there is a negative zero point offset (case F), that is, the case shown by the two-dot chain line in the upper half of FIG. 12.

On the other hand, at the time of the right turning, as indicated by the hatching falling left in the lower half of FIG. 12, the threshold value ThUS is larger than the value necessary to prevent erroneous determination of an understeer state that is indicated by a one-dot chain line in the range of the steering angle STR from STR1 to STR2'. Therefore, in the range of the steering angle, even when the understeer control is to be executed, the understeer control may not be executed in some cases. However, the driver preferably attempts to reduce a turning radius of the vehicle by increasing steering in the right turning direction while lowering the vehicle speed. Therefore, a correction for educing the threshold value ThUS to a value indicated by a one-dot chain line may not be performed.

DETAILED DESCRIPTION OF THE PREFERRED EMBODIMENTS

The present disclosure will now be described in detail with reference to the accompanying drawings.

[First Embodiment]

Figure 1:
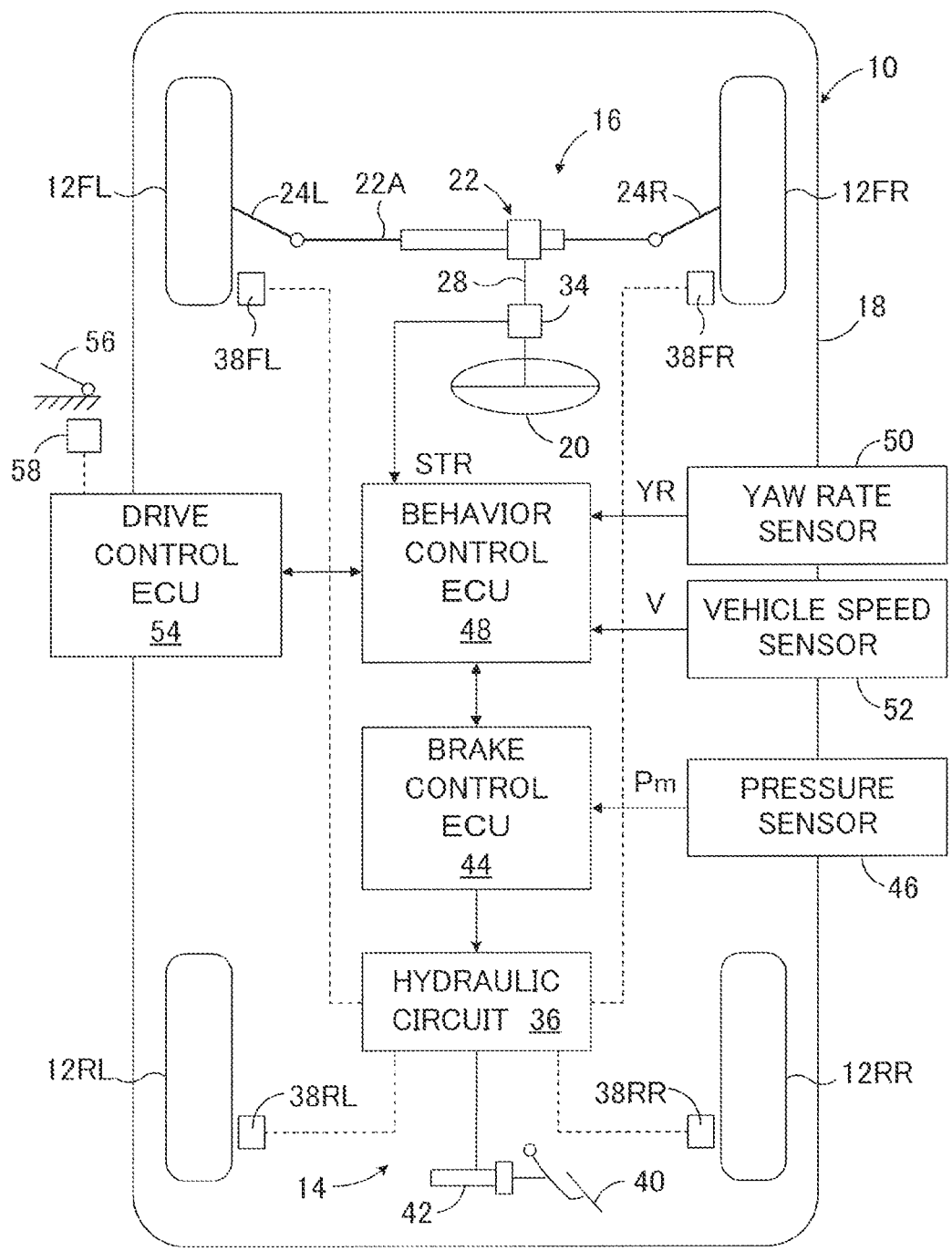
FIG. 1 is a schematic configuration diagram showing a first embodiment of a vehicle behavior control apparatus according to the present disclosure.

In FIG. 1, the behavior control apparatus 10 according to the embodiment includes a braking device 14 that applies braking force to left and right front wheels 12FL and 12FR and left and right rear wheels 12RL and 12RR and a steering device 16 that steers the left and right front wheels 12FL and 12FR. The left and right front wheels 12FL and 12FR are steered through tie rods 24L and 24R by a rack and pinion device 22 which is driven in response to an operation of a steering wheel 20 by a driver.

Figure 2:
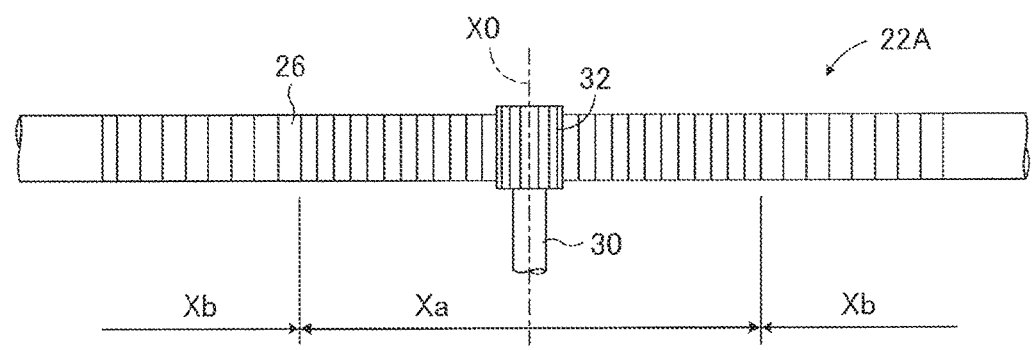
FIG. 2 is a plan view showing a rack bar of the steering apparatus shown in FIG. 1.

The rack and pinion device 22 includes a rack bar 22A that reciprocates in the lateral direction of a vehicle 18, and the rack bar 22A is connected to the tie rods 242L and 24R at the left end and the right end, respectively. As shown in FIG. 2, the rack bar 22A has a plurality of rack teeth 26. A pinion 32 is provided on a pinion shaft 30 connected to a steering shaft 28 rotated together with the steering wheel 20, and the pinion 32 meshes with the rack teeth 26.

The rack bar 22A is a variable gear ratio type rack bar driven in the lateral direction of the vehicle by the rotation of the pinion 32. The pitch of the rack teeth 26 is a standard value in a position X 0 at which the pinion 32 meshes when the vehicle 18 runs straight and in a predetermined range Xa on both the left and right sides thereof, and is a standard value in a range Xb outside the predetermined range. The teeth of the illustrated rack teeth 26 and the pinion 32 are flat teeth, but may be bevel teeth.

Figure 3:
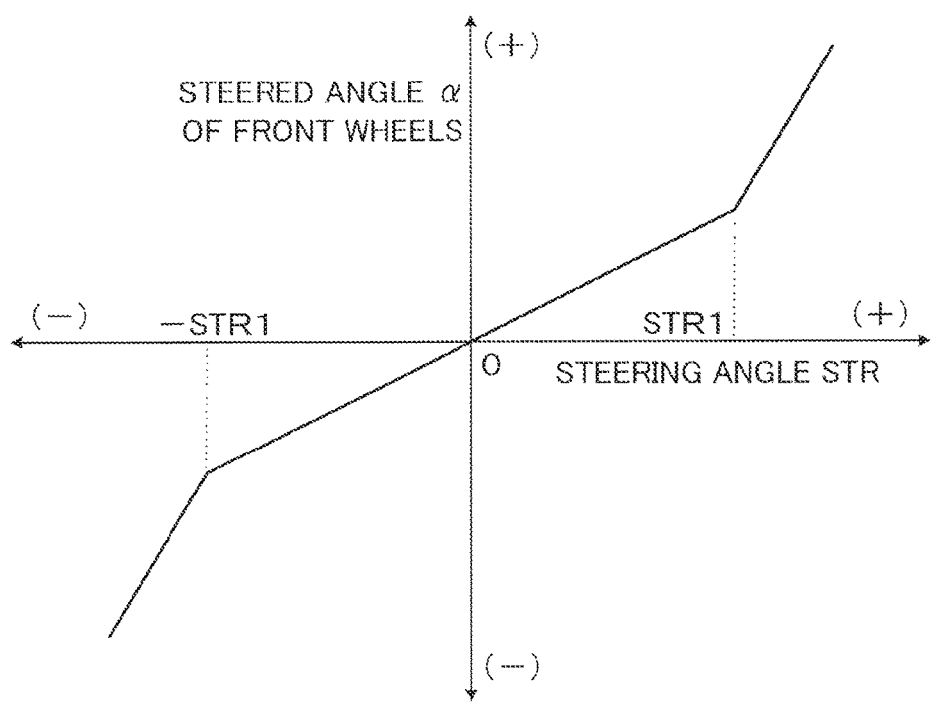
FIG. 3 is a graph showing a relationship between an absolute value of a steering angle STR and a steered angle $\alpha$ of front wheels in the first embodiment.

As shown in FIG. 1, the steering shaft 28 is provided with a steering angle sensor 34 that detects a rotation angle of the shaft as a steering angle STR. The steering angle sensor 34 detects the steering angle STR by setting the steering angle corresponding to the straight travel of the vehicle 18 to 0 and setting the steering angle in the left turning direction and the steering angle in the right turning direction as positive and negative values respectively. As shown in FIG. 3, in the range where an absolute value of the steering angle STR is not more than the first reference value STR1 (positive constant), the ratio of the steered angle of the left and right front wheels 12 FL and 12 FR to the steering angle STR, that is, the steering gear ratio RS is a standard value, and is a value larger than the standard value in a range where an absolute value of the steering angle STR exceeds the first reference value STR1.

In FIG. 3, for the purpose of explanation, the steering gear ratio RS is shown to be in a linear relationship with respect to the steering angle STR even in a range where an absolute value of the steering angle STR exceeds the first reference value STR1. However, an actual steering gear ratio in the range where an absolute value of the steering angle STR exceeds the first reference value STR1 may be nonlinearly related to the steering angle SIR so as to gradually decrease as an absolute value of the steering angle STR increases.

The braking device 14 includes a hydraulic circuit 36, wheel cylinders 38FR, 38FL, 38RR and 38RL provided in the wheels 12FL to 12RL, a master cylinder 42 for pressuring and feeding brake oil in response to a driver's depression operation of a brake pedal 40. Although not shown in detail in FIG. 1, the hydraulic circuit 36 includes a reservoir, an oil pump, various valve devices and the like and functions as a brake actuator.

The pressures in the wheel cylinders 38FL to 38RR are controlled in accordance with a pressure in the master cylinder 42, that is, a master cylinder pressure Pm, the cylinder being normally driven in response to depression of the brake pedal 40 by the driver. Further, the pressures in the wheel cylinders 38FL to 38RR are controlled regardless of a depression amount of the brake pedal 40 by the driver by means of the oil pump and various valve devices are controlled by a brake control electronic control unit 44 as needed. In FIG. 1, the "electronic control device" is denoted as "ECU".

The master cylinder 42 is provided with a pressure sensor 46 that detects the master cylinder pressure Pm, and a signal indicating the master cylinder pressure Pm detected by the pressure sensor 46 is input to the brake control electronic control unit 44. The electronic control unit 44 controls the braking pressures of the respective wheels, that is, the pressures in the wheel cylinders 38FL to 38RR on the basis of the master cylinder pressure Pm, whereby the braking force of each wheel is controlled according to a depression operation amount of the brake pedal 40, i.e., a braking operation amount of the driver. Further, as will be described in detail later, the electronic control device 44 controls the braking force of each wheel as needed based on a request from a behavior control electronic control device 48.

A signal indicating the steering angle STR is input from the steering angle sensor 34 to the behavior control electronic control unit 48, and signals indicating a yaw rate YR and a vehicle speed V of the vehicle are inputted from a yaw rate sensor 50 and a vehicle speed sensor 52, respectively. Similarly to the steering angle sensor 34, the yaw rate sensor 50 detects a yaw rate YR by setting a yaw rate corresponding to the straight running of the vehicle 18 to 0 and setting yaw rates in the left turning direction and the right turning direction to positive values and negative values, respectively.

As shown in FIG. 1, the vehicle 18 is provided with a drive control electronic control unit 54. In the normal state, the electronic control unit 54 controls an output of an engine not shown in FIG. 1 based on an accelerator opening degree ACC detected by an accelerator opening degree sensor 58 provided on an accelerator pedal 56. In the embodiment, the left and right front wheels 12FL and 12FR are drive wheels, and the electronic control unit 54 controls the output of the engine based on a request of the behavior control electronic control unit 48 as will be described in detail later so as to control the driving forces of the left and right front wheels 12FL and 12FR as necessary. Note that the vehicle to which the behavior control apparatus 10 of the present disclosure is applied may be a rear wheel drive vehicle or a four wheel drive vehicle.

The behavior control electronic control unit 48 calculates a steering angle conversion value STRY of a yaw rate YR detected by the yaw rate sensor 50. The electronic control unit 48 calculates a zero point offset amount ΔYR of the yaw rate sensor 50 based on a yaw rate YR detected by the yaw rate sensor 50 when the vehicle 18 is stopped. A zero point offset amount ΔYR is a positive value when a zero point offset of the yaw rate sensor 50 is offset in the leftward turning direction of the vehicle. The electronic control unit 48 calculates a steering angle conversion value STRY of a yaw rate based on a yaw rate YR and calculates a deviation ΔSTR (=STR−STRY) between the steering angle STR and the steering angle conversion value STRY as an index value of an understeer state.

As will be described in detail later, when a steering angle STR is a positive value and a deviation ΔSTR is larger than a threshold value ThUS (a positive value), or when a steering angle STR is a negative value and a deviation ΔSTR is smaller than −ThUS, it is determined that the vehicle 18 is in an understeer state. When it is determined that the vehicle 18 is in an understeer state, the electronic control unit 48 controls the braking/driving forces of the wheels via the electronic control units 44 and 54 so as to decrease a magnitude of the deviation ΔSTR, so that a degree of the understeer state is decreased (understeer control). In this way, the electronic control device 48 functions as a main control device that performs the understeer control in cooperation with the electronic control devices 44 and 54.

Further, when the sign of the steering angle STR and the sign of the zero point offset ΔYR are the same and a magnitude of the zero point offset ΔYR exceeds a second reference value YR1 (a positive value), the electronic control unit 48 corrects the threshold value ThUS according to the steering angle STR and the zero point offset amount ΔYR so that it becomes difficult to determine that the vehicle is in an understeer state.

Although not shown in detail in FIG. 1, the electronic control units 44, 48, and 54 each include a microcomputer and a drive circuit, and exchange necessary information with each other. Each microcomputer has a general configuration in which a CPU, a ROM, a RAM, and an input/output port device are included, and these are mutually connected by a bidirectional common bus.

In particular, the microcomputer of the behavior control electronic control unit 48 has a backup memory such as an EEPROM which maintains necessary information storage even when an ignition switch (not shown) is off. The ROM of the microcomputer of the electronic control unit 48 stores a control program corresponding to the flow chart shown in FIG. 4 to be described later, and the CPU achieves the above control by executing the control program.

Figure 4:
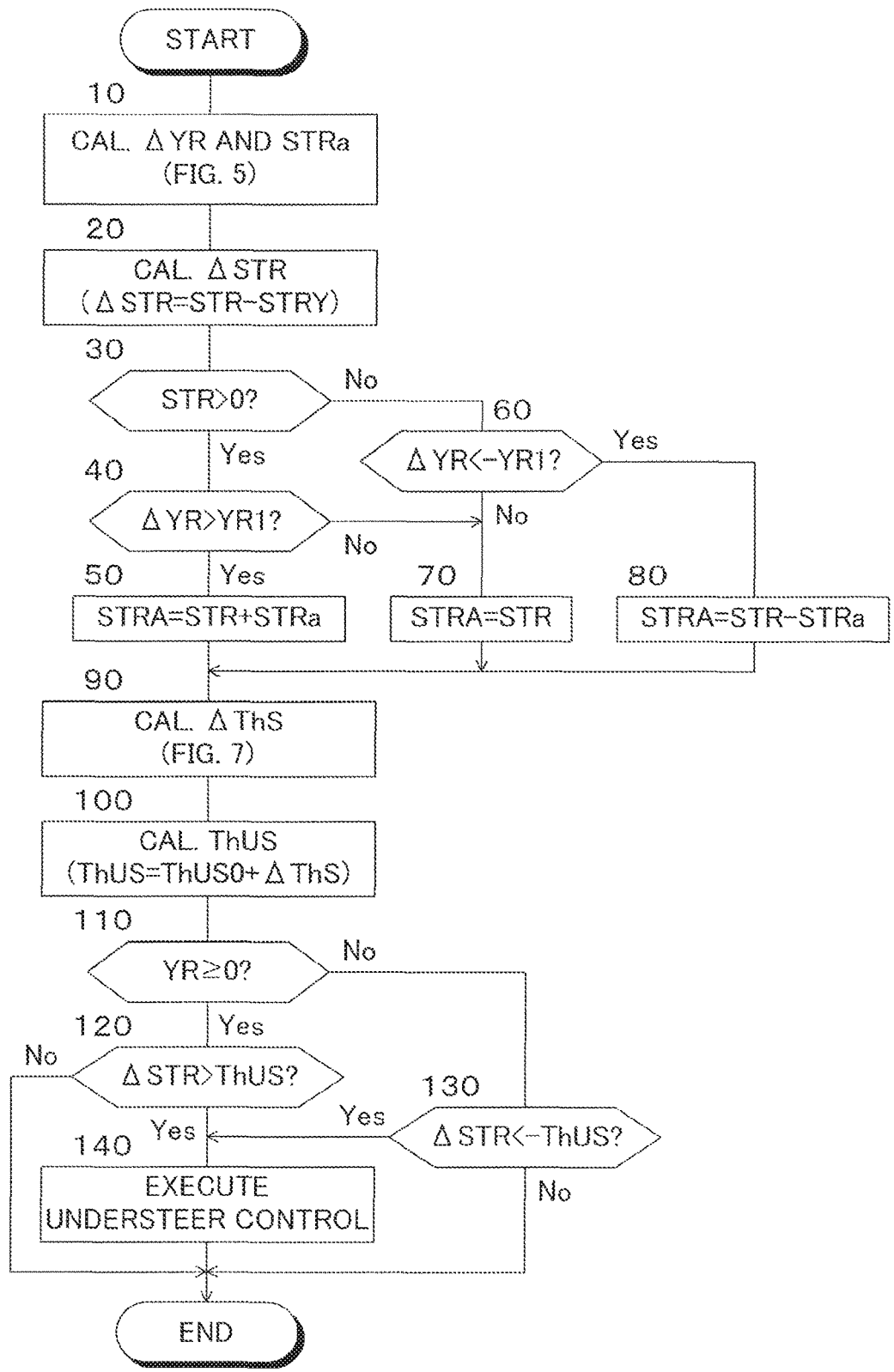
FIG. 4 is a flowchart showing an understeer control routine according to the first embodiment.

Next, the understeer control routine in the first embodiment will be described with reference to the flowchart shown in FIG. 4. The control according to the flowchart shown in FIG. 4 is repeatedly executed at predetermined time intervals when the ignition switch (not shown) is on. In the following description, the understeer control according to the flowchart shown in FIG. 4 is simply referred to as "the control". This also applies to the second embodiment to be described later.

Figure 5:
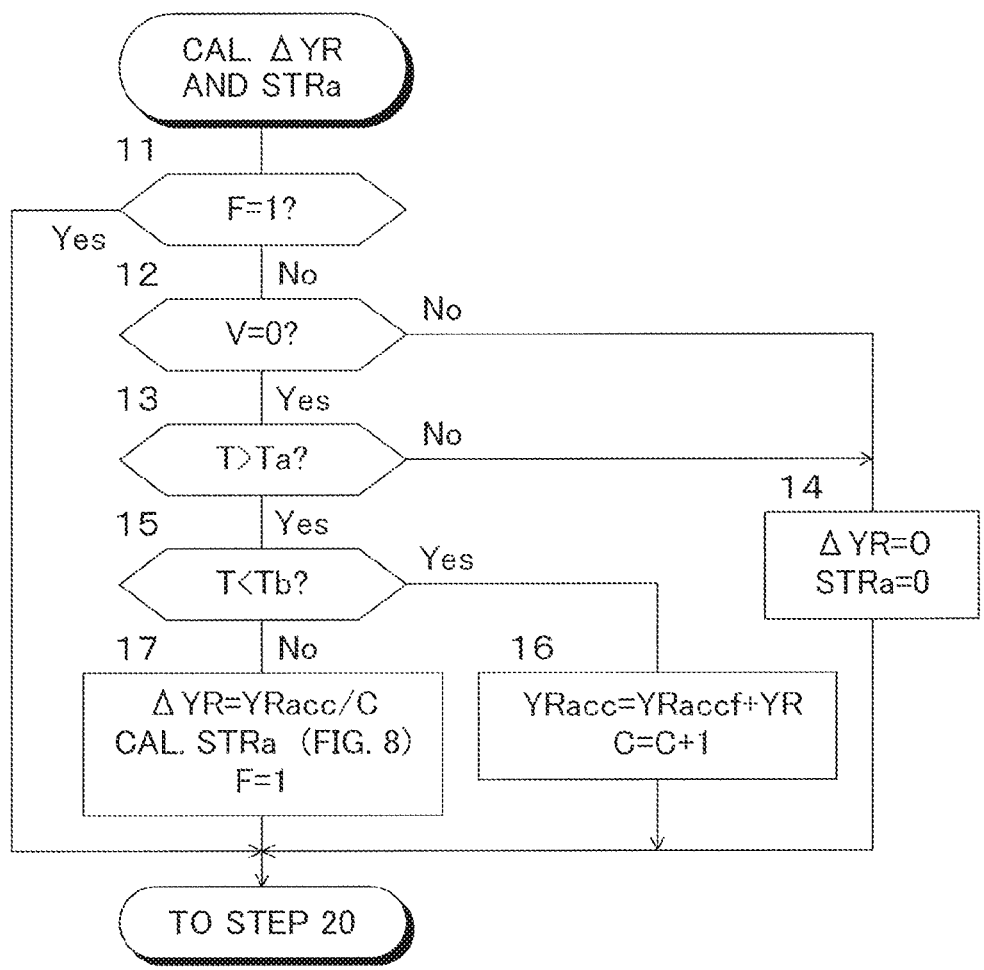
FIG. 5 is a flowchart showing a subroutine for calculating a zero point offset amount $\Delta$YR of a yaw rate sensor and a correction amount STRa of the steering angle executed in step 10 of the flowchart shown in FIG. 4.

First, in step 10, a zero point offset amount ΔYR of the yaw rate sensor 50 and a correction amount STRa of a steering angle STR based on the zero point offset amount ΔYR are calculated according to the flowchart shown in FIG. 5. Prior to the execution of step 10, reading of the steering angle STR detected by the steering angle sensor 34 and the like is performed.

In step 20, the steering gear ratio RS is calculated by referring to a map (not shown) stored as an inclination of the graph shown in FIG. 3 based on the steering angle STR, for example. Also, a steering angle conversion value STRY of a yaw rate YR detected by the yaw rate sensor 50 is calculated based on the steering gear ratio RS and the vehicle speed V according to the following equation (1). Further, a steering angle deviation ΔSTR is calculated as a value (STR−STRY) obtained by subtracting the steering angle conversion value STRY from the steering angle STR. In the following equation (1), H is the wheel base of the vehicle 18.

$$STRY = YR * RS * H * V \quad (1)$$

In step 30, it is determined whether or not the steering angle STR is positive, that is, whether or not the vehicle 18 is steered so as to turn to the left. When a negative determination is made, the control proceeds to step 60, and when the positive determination is made, the control proceeds to step 40.

In step 40, a determination is made as to whether or not the zero point offset amount ΔYR is greater than the reference value YR1 (a positive constant). When a negative determination is made, the control proceeds to step 70, and when a positive determination is made, the control proceeds to step 50.

When an affirmative determination is made in step 40, the zero point offset of the yaw rate sensor 50 is an offset in the left turning direction, and the steering angle used for calculating the correction amount ΔThs of the threshold value ThUS in step 90 described later is to be corrected to increase.

Therefore, in step 50, the corrected steering angle STRA is set to a sum (STR+STRa) of the steering angle STR and the correction amount STRa.

In step 60, it is determined whether or not the zero point offset amount ΔYR is smaller than −YR1. When affirmative determination is made, the control proceeds to step 80, and when negative determination is made, the control proceeds to step 70.

In step 70, since it is unnecessary to correct the steering angle used for calculating the correction amount ΔThS of the threshold value ThUS in the later-described step 90, the corrected steering angle STRA is set to the steering angle SIR.

When an affirmative determination is made in step 60, the zero point offset of the yaw rate sensor 50 is an offset in the right turning direction, and an absolute value of the steering angle used for calculating the correction amount ΔThs of the threshold value ThUS in step 90 is to be corrected to increase. Therefore, in step 80, the corrected steering angle STRA is set to a value (STR−STRa) obtained by subtracting the correction amount STRa (a positive value) from the steering angle STR (a negative value).

Figure 7:
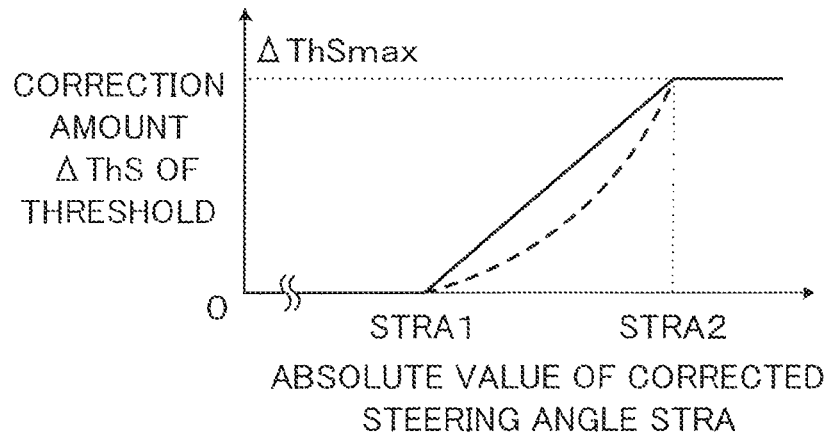
FIG. 7 is a map of the relationship between an absolute value of a corrected steering angle STRA and a correction amount $\Delta$Ths of a threshold value.

Upon completion of step 50, 70 or 80, the control proceeds to step 90. In step 90, the map indicated by the solid line in FIG. 7 is referenced based on the absolute value of the corrected steering angle STRA to calculate the correction amount ΔThS of the threshold value ThUS for detining an understeer state. As shown in FIG. 7, the correction amount ΔThS is 0 when the absolute value of the corrected steering angle STRA is equal to or less than the reference value STRA1 (a positive constant), and the correction amount ΔThS is equal to a maximum value ΔThSmax (a positive constant) when an absolute value of the corrected steering angle STRA Is larger than the reference value STRA2 (a positive constant larger than STRA1).

Further, when the absolute value of the corrected steering angle STRA is larger than the reference value STRA1 and smaller than the reference value STRA2, the correction amount ΔThS increases as the absolute value of the corrected steering angle STRA increases. In the map shown by the solid line in FIG. 7, the correction amount ΔThS linearly increases as the absolute value of the corrected steering angle STRA increases. However, as indicated by the broken line in FIG. 7, for example, the correction amount ΔThS may increase nonlinearly as an absolute value of the corrected steering angle STRA increases corresponding to the relationship of the steering gear ratio RS with respect to the steering angle STR.

In step 100, the threshold value ThUS for determining a understeer state is calculated as a sum of the standard threshold value ThUS0 (a positive constant) and the threshold value correction amount ΔThS (ThUS0+ΔThS).

In step 110, it is determined whether or not the yaw rate YR is positive or zero. That is, whether or not it is a value corresponding to leftward turning or straight running of the vehicle 18 is determined. When a negative determination is made, the control proceeds to step 130, and when the positive determination is made, the control proceeds to step 120.

In step 120, it is determined whether or not the steering angle deviation ΔSTR is larger than the threshold value ThUS for determining an understeer state, that is, whether or not the vehicle 18 is in an understeer state at the time of left turn. When a negative determination is made, the control is temporarily terminated, and when an affirmative determination is made, the control proceeds to step 140.

In step 130, it is determined whether or not the steering angle deviation ΔSTR is smaller than −ThUS. That is, it is determined whether the vehicle 18 is in an understeer state at the time of the right turn. When a negative determination is made, the control is temporarily terminated, and when an affirmative determination is made, the control proceeds to step 140, In step 140, the understeer control is executed, whereby the degree of the understeer state is reduced. In other words, the braking/driving force of the wheels is controlled through the braking control electronic control unit 44 and the drive control electronic control unit 54 in a manner known in the art so that the magnitude of the steering angle deviation ΔSTR decreases. Specifically, the driving forces of the left and right front wheels 12FL and 12FR are lowered, and further, as necessary, the braking force is applied to the inner front wheel or the inner front and rear turning wheels.

Next, with reference to the flowchart shown in FIG. 5, a subroutine for calculating a zero point offset amount ΔYR of the yaw rate sensor and a correction amount STRa of the steering angle executed in step 10 will be described.

First, in step 11, it is determined whether or not a flag F is 1, that is whether or not the zero point offset amount ΔYR and the steering angle correction amount STRa have been calculated is determined. When an affirmative determination is made, the control proceeds to step 20, and when a negative determination is made, the control proceeds to step 12. Notably, the flag F is initialized to 0 at the start of the control.

In step 12, it is determined whether the vehicle speed V is 0, that is, whether or not the vehicle 18 is in a stopped state. When a negative determination is made, the control proceeds to step 14, whereas a positive determination is made, the control proceeds to step 13.

In step 13, it is determined whether or not an elapsed time T after turning on the ignition switch (not shown in FIG. 1) is larger than a lower limit reference value Ta (a positive constant). When a negative determination is made, in step 14, the zero point offset amount ΔYR and the correction amount STRa of the steering angle are set to 0, respectively, and when a positive determination is made, the control proceeds to step 15. The lower limit reference value Ta is a time required from when the ignition switch is turned on until the operation of the yaw rate sensor 50 is stabilized.

In step 15, it is determined whether or not the elapsed time T from turning on the ignition switch is smaller than an upper limit reference value Tb (a positive constant larger than Ta). When a negative determination is made, the control proceeds to step 17, and when an affirmative determination is made, the control proceeds to step 16. The upper limit reference value Tb is a reference value for ensuring that a time necessary for computing an average value of the detection values of the yaw rate sensor 50 to a stable value has elapsed from the time point of the lower limit reference value Ta.

In step 16, representing an integrated value of the yaw rate YR detected by the yaw rate sensor 50 as Yracc and representing the previous value of the integrated value YRacc as YRaccf, the integrated value YRacc is set as a sum of the previous value YRaccf and the current detected yaw rate YR (YRaccf+YR). Furthermore, a count value C of a counter concerning the number of integration of the yaw rate YR is incremented by one. The count value C is also initialized to 0 at the start of the control.

In step 17, a zero point offset amount ΔYR of the yaw rate sensor 50 is calculated as a value (YRacc/C) obtained by dividing the integrated value YRacc of the yaw rate YR by the count value C. Further, a correction amount STRa of a steering angle is calculated by referring to a map indicated by the solid line in FIG. 8 based on the absolute value of the zero point offset amount ΔYR. Further, the flag F is set to 1. Note that when steps 14, 16 or 17 are completed, the control proceeds to step 20.

Figure 8:
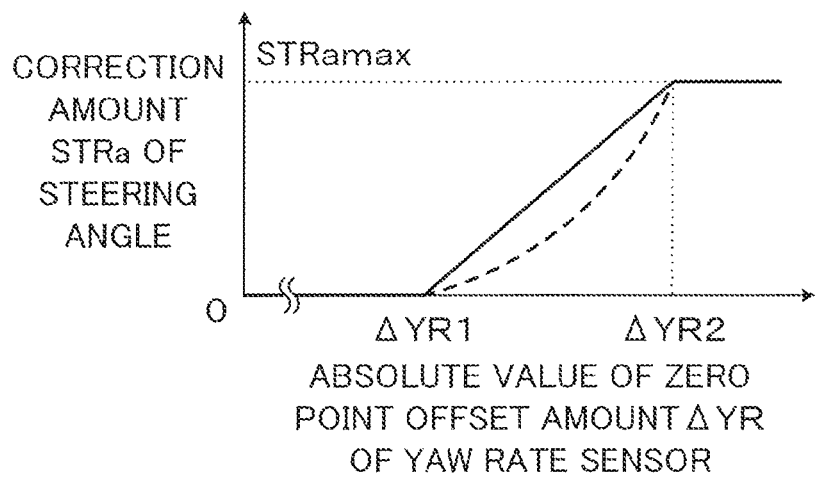
FIG. 8 is a map of a relationship between an absolute value of a zero point offset amount $\Delta$YR of a yaw rate sensor and a correction amount STRa of a steering angle STR based on the zero point offset amount $\Delta$YR.

As shown in FIG. 8, the correction amount STRa is 0 when the absolute value of the zero point offset amount ΔYR is equal to or smaller than the deviation reference value ΔYR1 (a positive constant), and is a maximum value STRamax (a positive constant) when the absolute value of the zero point offset amount ΔYR is equal to or larger than the deviation reference value ΔYR2 (a positive constant larger than the deviation reference value ΔYR1), Further, in the map shown by the solid line in FIG. 8, when the absolute value of the zero point offset amount ΔYR is larger than the reference value ΔYR1 and smaller than the reference value ΔYR2, the correction amount STRa increases linearly as the absolute value of the zero point offset amount ΔYR increases. However, as shown by the broken line in FIG. 8, for example, the correction amount STRa may be set so as to nonlinearly increase as the absolute value of the zero point offset amount ΔYR increases.

Next, the operation of the first embodiment will be described with respect to the above cases A to F.

<Case a (when the Vehicle is not in an Understeer State and there is No Zero Point Offset)>

In step 10, the correction amount STRa of the zero point offset amount ΔYR and the steering angle STR are each calculated as 0 and the steering angle conversion value STRY of the yaw rate YR is substantially equal to the steering angle STR, so in step 20, the steering angle deviation ΔSTR is calculated to be 0 or a value close to 0. When turning to the left; positive and negative determinations are made in steps 30 and 40, respectively; and in the right turn, negative determinations are made in steps 30 and 60. In step 70, the corrected steering angle STRA is set to the steering angle STR.

In step 90, the correction amount ΔThS of the threshold value ThUS is calculated, and in step 100, the threshold value ThUS is calculated. Since the steering angle deviation ΔSTR is a value close to 0 or 0, positive and negative determinations are made in steps 110 and 120, respectively, when the vehicle is turning to the left, and negative determinations are made in steps 110 and 130 in the right turn. The understeer control is not executed.

<Case B (when the Vehicle is in an Understeer State and there is No Zero Point Offset)>

In step 10, the zero point offset amount ΔYR and the correction amount STRa of the steering angle STR are calculated to be zero. In step 20, the steering angle deviation ΔSTR is calculated to a value other than 0. When turning to the left, positive and negative determinations are made in steps 30 and 40 respectively, and in the right turn, negative determinations are made in steps 30 and 60. In step 70, the corrected steering angle STRA is set to the steering angle STR.

In step 90, the correction amount ΔThS of the threshold value ThUS is calculated, and in step 100, the threshold value ThUS is calculated. When the magnitude of the steering angle deviation ΔSTR is equal to or less than the threshold value ThUS, positive and negative determinations are made in steps 110 and 120, respectively, and in the case of right turn, negative determinations are made in steps 110 and 130. The understeer control is not executed. On the other hand, when the magnitude of the steering angle deviation ΔSTR is larger than the threshold value ThUS, affirmative determinations are made in steps 110 and 120 when turning to the left, and negative and positive determinations are made in steps 110 and 130 when turning to the right. The understeer control is executed in step 140.

<Case C (when the Vehicle is not in an Understeer State but there is a Positive Zero Point Offset)>

In step 10, the zero point offset amount ΔYR and the correction amount STRa of the steering angle STR are calculated to be positive values. In step 20, the steering angle deviation ΔSTR is calculated to be 0 or a value close to 0. At the time of left turning, when the zero point offset amount ΔYR is larger than the reference value YR1, positive determinations are made in steps 30 and 40, and in step 50, the corrected steering angle STRA is set to a sum of the steering angle STR and the correction amount STRa. When the zero point offset amount ΔYR is equal to or less than the reference value YR1, a negative determination is made in step 40, so that the corrected steering angle STRA is set to the steering angle STR in step 70. At the time of the right turn, negative determinations are made in steps 30 and 60, and the corrected steering angle STRA is set to the steering angle STR in step 70.

As in the case A, since the steering angle deviation ΔSTR is a value close to 0 or 0, positive and negative determinations are made in steps 110 and 120, respectively, when the vehicle is turning to the left and in the case of right turning, negative determinations are made in steps 110 and 130. The understeer control is not executed.

<Case D (when the Vehicle is in an Understeer State and there is a Positive Zero Point Offset)>

Steps 10 to 80 are executed in the same manners as in the case C, except that in step 20, the steering angle deviation ΔSTR is calculated to a value other than 0.

As in the case C, when the magnitude of the steering angle deviation ΔSTR is less than or equal to the threshold value ThUS, positive and negative determinations are made in steps 110 and 120, respectively, when the vehicle is turning to the left, while in the case of rightward turning, negative determinations are made in steps 110 and 130. The understeer control is not executed. On the other hand, when the magnitude of the steering angle deviation ΔSTR is larger than the threshold value ThUS, affirmative determinations are made in steps 110 and 120 when turning to the left, and negative and affirmative determinations are made in steps 110 and 130, respectively, when turning to the right. The understeer control is executed in step 140.

In cases C and D, when the absolute value of the corrected steering angle STRA is larger than the reference value STRA1 and the vehicle turns to the left, the correction amount ΔThS of the threshold value ThUS is calculated to be a positive value in step 90. Therefore, as shown in the positive region in the lower half of FIG. 11, the range in which the threshold value ThUS is corrected to be larger than the standard value ThUS0 is expanded to a smaller value side of the absolute value of the steering angle STRA as compared to where there is no positive zero point offset.

<Case E (when the Vehicle is not in an Understeer State but there is a Negative Zero Point Offset)>

In step 10, the zero point offset amount ΔYR and the correction amount STRa of the steering angle STR are calculated to be negative values. In step 20, the steering angle deviation ΔSTR is calculated to be 0 or a value close to 0. When turning to the left, positive and negative determinations are made in steps 30 and 40, respectively, and the corrected steering angle STRA is set to the steering angle STR in step 70. At the time of right turn, when the zero point offset amount ΔYR is smaller than −YR1, negative and an affirmative determinations are made in steps 30 and 60, respectively, and in step 80, the corrected steering angle STRA is set to a value obtained by subtracting a correction amount STRa from the steering angle STR. When the zero point offset amount ΔYR is equal to or greater than −YR1, a negative determination is made in step 60, so that the corrected steering angle STRA is set to the steering angle STR in step 70.

As in the above cases A and C, since the steering angle deviation ΔSTR is 0 or close to 0, positive and negative determinations are made in steps 110 and 120, respectively, when turning to the left, and in the case of right turn, negative determinations are made in steps 110 and 130. The understeer control is not executed.

<Case F (when the Vehicle is in an Understeer State and there is a Negative Zero Point Offset)>

Steps 10 to 80 are executed in the same manners as in the case E, except that in step 20, the steering angle deviation ΔSTR is calculated to a value other than 0.

In the same manners as in the cases B and D, when the magnitude of the steering angle deviation ΔSTR is equal to or less than the threshold value ThUS, positive and negative determinations are made in steps 110 and 120, respectively, at the time of leftward turning, and negative determinations are made in steps 110 and 130 when turning to the right. The understeer control is not executed. On the other hand, when the magnitude of the steering angle deviation ΔSTR is larger than the threshold value ThUS, affirmative determinations are made in steps 110 and 120 when turning to the left, and negative and affirmative determinations are made in steps 110 and 130, respectively, when turning to the right. The understeer control is executed in step 140.

In cases E and F, when the absolute value of the corrected steering angle STRA is larger than the reference value STRA1 and the vehicle turns to the right, the correction amount ΔThS of the threshold value ThUS is calculated to be a positive value in step 90. Therefore, as shown in the negative region in the lower half of FIG. 12, the range in which the threshold value ThUS is increased to be more than the standard value ThUS0 is expanded to the smaller side of the absolute value of the steering angle STRA.

As understood from the above explanations, according to the first embodiment, when the vehicle is in an understeer state and there is a zero-point offset (cases D and F), the range in which the threshold value ThUS is increased to be more than the standard value ThUS0 is expanded to the side where the absolute value of the steering angle STRA is smaller as compared to where there is no zero point offset. Therefore, as indicated by the solid lines in the positive region of the lower half of FIG. 11 and in the negative region of the lower half of FIG. 12, even when the zero offset is present, a possibility that an affirmative determination is unnecessarily performed in step 110 or 130 can be reduced as compared to where the range in which the threshold value ThUS is increased is not expanded. That is, it is possible to reduce the possibility of erroneous determination that the vehicle is in an understeer state although the vehicle 18 is not actually in an understeer state. Therefore, the possibility can be reduced that the driver feels troublesome due to execution of unnecessary control of the braking/driving forces of the wheels by unnecessary understeer control.

Further, according to the first embodiment, in step 10, a correction amount STRa of the steering angle STR is calculated based on the absolute value of the zero point offset amount ΔYR. Further, in step 50 or 80, a corrected steering angle STRA is calculated by correcting the steering angle STR with the correction amount STRa, and in step 90, based on the corrected steering angle STRA, a correction amount ΔThS of the threshold value ThUS is calculated. Therefore, necessary increase correction of the threshold value ThUS can be performed based on both the steering angle STR and the zero point offset amount ΔYR.

Further, according to the first embodiment, the correction amount ΔThS is calculated to be 0 when the absolute value of the corrected steering angle STRA is equal to or less than the reference value STRA1 as the third reference value, and is calculated as a positive value when the absolute value of the corrected steering angle STRA is larger than the reference value STRA1. Consequently, the threshold value ThUS can be increased in the range where the absolute value of the corrected steering angle STRA is larger than the reference value STRA1, while preventing the threshold value ThUS from unnecessarily increasing in the range where the absolute value of the corrected steering angle STRA is equal to or less than the reference value STRA1. Therefore, it is possible to reduce the possibility of erroneous determination that the vehicle is in an understeer state in the range where the absolute value of the corrected steering angle STRA is larger than the reference value STRA1, while avoiding making it difficult to determine that the vehicle is in an understeer state in the range where the absolute value of the corrected steering angle STRA is equal to or less than the reference value STRA1.

Further, according to the first embodiment, as shown in FIG. 7, when the absolute value of the corrected steering angle STRA is larger than the reference value STRA1 and smaller than the reference value STRA2, the correction amount ΔThS gradually increases from 0 as the absolute value of the corrected steering angle STRA increases. Therefore, when the absolute value of the corrected steering angle STRA is larger than the reference value STRA1, the correction amount ΔThS can be prevented from abruptly changing when the absolute value of the corrected steering angle STRA changes to the upper and lower sides of the reference value STRA1 as compared to where the correction amount ΔThS is set to a preset positive value. Further, the threshold value ThUS can be increased as the absolute value of the corrected steering angle STRA increases, and the possibility of erroneous determination that the vehicle is in an understeer state in a range where the magnitude of the steering angle STR is large can be reduced in accordance with the magnitude of a steering angle STR.

Further, according to the first embodiment, in step 10, a correction amount STRa of the steering angle STR is calculated based on the absolute value of the zero point offset amount ΔYR. In step 90, the correction amount ΔThS of the threshold value ThUS is calculated based on the corrected steering angle STRA. Therefore, as compared to where maps for calculating the correction amount ΔThS are switched according to the zero point offset amount ΔYR, a correction amount ΔThs of the threshold value ThUS can be easily calculated.

Further, according to the first embodiment, a correction amount ΔThS of the threshold value ThUS is calculated as a value added to the standard value ThUS0 that is constant irrespective of a steering angle STRA. Therefore, it is possible to easily calculate the correction amount ΔThS as compared to where the standard value ThUS0 is set to a larger value in a range where the magnitude of the steering angle STRA than in a range where the steering angle STRA is small and the correction amount ΔThS is calculated as a value added to the standard value ThUS0.

Further, according to the first embodiment, as shown in FIG. 7, the correction amount ΔThS is a constant value ΔThSmax in a range where the absolute value of the corrected steering angle STRA is larger than the reference value STRA2 is there. Therefore, it is possible to reduce the possibility of erroneous determination that the vehicle 18 is not in an understeer state in spite of the fact that the vehicle is actually in an understeer state due to excessively large threshold value ThUS in a situation where the absolute value of the corrected steering angle STRA is large.

[Second Embodiment]

Figure 6:
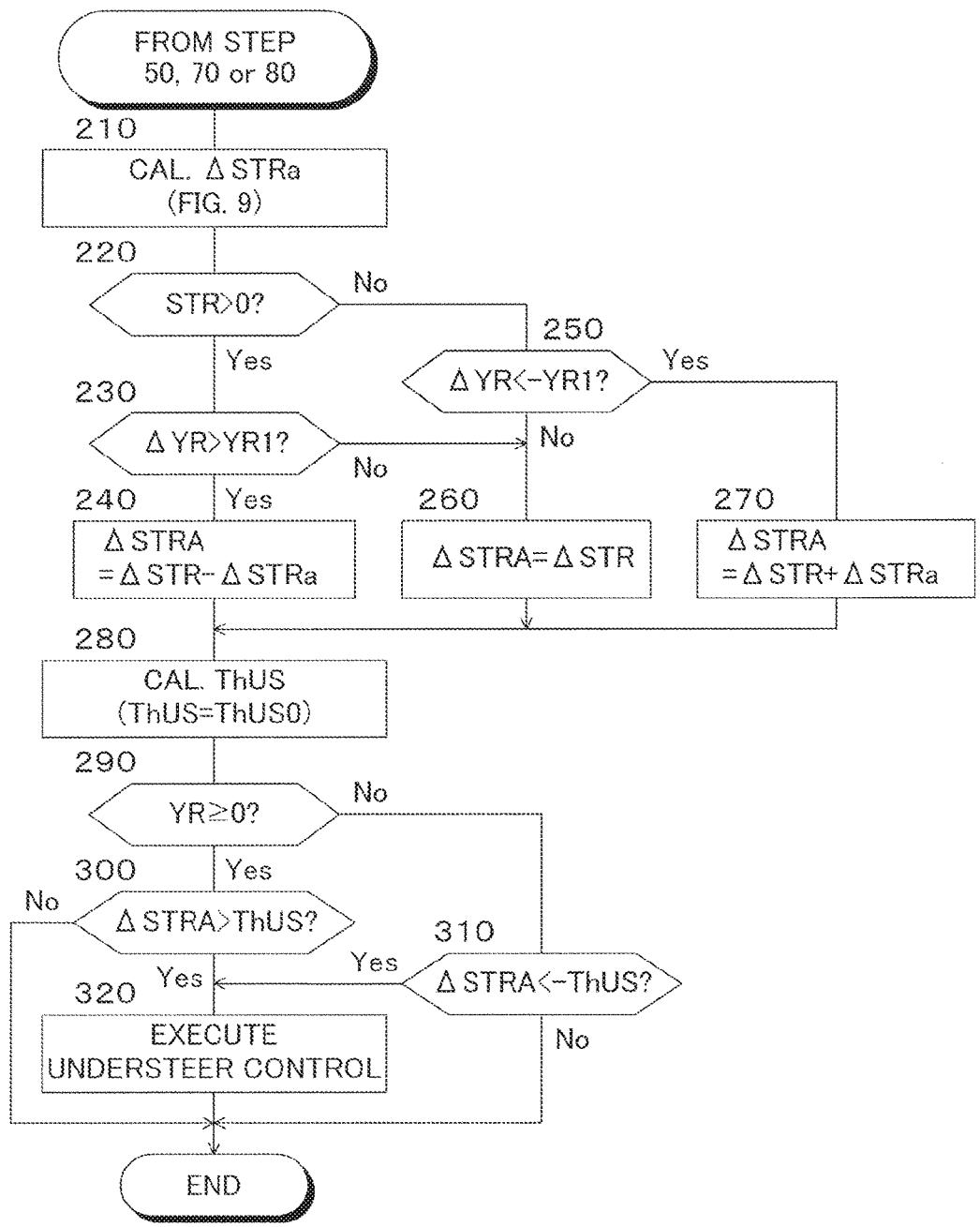
FIG. 6 is a flowchart showing an understeer control routine according to a second embodiment.

In the second embodiment, the electronic control unit 48 reduces a magnitude of the steering angle deviation ΔSTR as necessary based on the steering angle STR and the zero point offset amount ΔYR in accordance with the flowchart shown in FIG. 6 instead of increasing the threshold value ThUS. That is, the electronic control unit 48 reduces a magnitude of the steering angle deviation ΔSTR is reduced and corrected so as to make it difficult to determine that the vehicle 18 is in an understeer state when the sign of the steering angle STR and the sign of the zero point offset ΔYR are the same and a magnitude of the zero point offset ΔYR exceeds the second reference value YR1. The understeer control itself is performed in the same manner as in the first embodiment.

Next, the understeer control routine in the second embodiment will be described with reference to the flowchart shown in FIG. 6.

As can be seen from a comparison between FIG. 6 and FIG. 4, the same steps as steps 10 to 80 in the first embodiment are executed, and when the steps 50, 70 or 80 are completed, the control proceeds to step 210. Steps 220, 230, 250, 290 and 320 are executed in the same manners as steps 30, 40, 60, 110 and 140 in the first embodiment, respectively.

Figure 9:
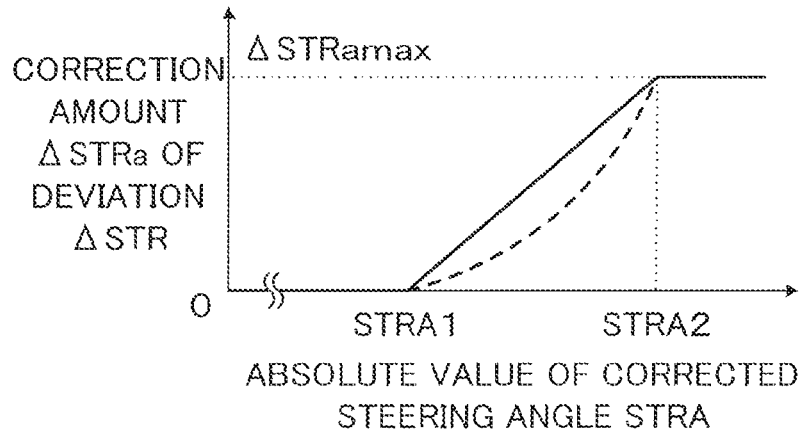
FIG. 9 is a map of a relationship between an absolute value of the corrected steering angle STRA and a correction amount $\Delta$STRa of a deviation $\Delta$STR.

In step 210, the correction amount ΔSTRa (a positive value) of the steering angle deviation ΔSTR is calculated by referring to a map indicated by the solid line in FIG. 9 based on the absolute value of the corrected steering angle STRA. As shown in FIG. 9, the correction amount ΔSTRa is 0 when the absolute value of the corrected steering angle STRA is equal to or smaller than the reference value STRA1 (a positive constant), and is the maximum value ΔSTRamax (a positive constant) when the absolute value of the corrected steering angle STRA is equal to or larger than the reference value STRA2 (a positive constant larger than the reference value STRA1).

Further, in the map shown by the solid line in FIG. 9, when the absolute value of the corrected steering angle STRA is larger than the reference value STRA1 and smaller than the reference value STRA2, the correction amount ΔSTRa linearly increases as the absolute value of the deviation ΔSTR increases. However, the correction amount ΔSTRa may nonlinearly increase as the absolute value of the corrected steering angle STRA increases, for example, as indicated by a broken line in FIG. 9 in accordance with the relationship of the steering gear ratio RS to the steering angle STR.

When an affirmative determination is made in step 230, it is necessary that the zero point offset of the yaw rate sensor 50 is an offset in the left turning direction, and the steering angle deviation used for the determination of an understeer state is to be decreasingly corrected. Therefore, in step 240, the corrected deviation ΔSTRA used for the determination of an understeer state is set to a value (ΔSTR−ΔSTRa) obtained by subtracting the correction amount ΔSTRa (a positive value) from the deviation ΔSTR (a positive value).

When a negative determination is made in step 230 or 250, since the steering angle deviation is not to be corrected, in step 260, the corrected deviation ΔSTRA provided for the determination of an understeer state is set to the deviation ΔSTR.

When an affirmative determination is made in step 250, the magnitude of the steering angle deviation used for the determination of an understeer state needs to be decreasingly corrected. Therefore, in step 270, the corrected deviation ΔSTRA is set to a sum (ΔSTR+ΔSTRa) of the deviation ΔSTR (a negative value) and the correction amount ΔSTRa (a positive value).

Upon completion of step 240, 260 or 270, the control proceeds to step 280. In step 280, the threshold value ThUS for determining an understeer state is set to the standard threshold value ThUS0 (a positive constant). In the second embodiment, step 280 may be omitted by setting the threshold value ThUS to the standard threshold value ThUS0 at the start of the control.

When an affirmative determination is made in step 290, the control proceeds to step 300. In step 300, it is determined whether or not the corrected steering angle deviation ΔSTRA (a positive value) is larger than the threshold value ThUS for determining an understeer state. That is, it is determined whether or not the vehicle 18 is in an understeer state at the time of left turn. When a negative determination is made, the control is once terminated, and when a positive determination is made, the control proceeds to step 320.

When a negative determination is made in step 290, the control proceeds to step 310. In step 310, it is determined whether or not the corrected steering angle deviation ΔSTRA (a negative value) is smaller than −ThUS. That is, it is determined whether or not the vehicle 18 is in a understeer state at the time of right turn. When a negative determination is made, the control is once terminated, and when a positive determination is made, the control proceeds to step 320.

According to the second embodiment, the threshold value ThUS is set to the standard threshold value ThUS0 that is a positive constant, but in a situation where the threshold value ThUS is increased above the standard threshold value ThUS0 in the first embodiment, a corrected steering angle deviation ΔSTRA is calculated as a value which equals to the deviation ΔSTR reduced in magnitude. Further, the determination as to whether the vehicle is in an understeer state or not is performed for the corrected deviation ΔSTRA.

Therefore, according to the second embodiment, by correcting the steering angle deviation ΔSTR instead of correcting the threshold value ThUS, it is possible to obtain the same or similar action and effect as those effect in the first embodiment regarding the determination of whether or not the vehicle is in a understeer state and the understeer control.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the calculation of a zero point offset amount ΔYR of the yaw rate sensor 50 is executed as a part of the behavior control routine. However, the calculation of a zero point offset amount ΔYR may be executed by a routine other than the behavior control routine and a calculation result may be read.

Note that the calculation of a zero point offset amount ΔYR may be executed by a routine other than the behavior control routine and a value detected by the yaw rate sensor 50 and corrected by the zero point offset amount ΔYR may be read as a yaw rate YR. In that case, since no component of the zero point offset amount ΔYR is included in the yaw rate YR, the correction of the threshold value ThUS in the first embodiment and the steering angle deviation ΔSTR in the second embodiment are unnecessary. That is, only step 20 and steps 110 to 140 of the flowchart shown in FIG. 4 may be executed for the behavior control.

In the above-described first and second embodiments, the standard value ThUS0 of the threshold value ThUS is a positive constant, but, in a range where the absolute value of the steering angle STR is large, may be larger than in a range where the absolute value of the steering angle STR is small. In that case, particularly in the first embodiment, it is preferable that a guard processing be performed after step 100 so that the threshold value ThUS does not exceed the maximum value ThUmax.

In the first embodiment described above, the threshold value ThUS is not decreasingly corrected even in a range of the steering angle where the threshold value ThUS becomes larger than a value necessary for preventing erroneous determination of an understeer state. However, the threshold value ThUS may be decreasingly corrected so that it becomes a value necessary for preventing erroneous determination of an understeer state.

Likewise, in the second embodiment described above, even in the steering angle range where a magnitude of the steering angle deviation ΔSTR is preferably corrected to increase in order to prevent erroneous determination of an understeer state, the magnitude of the steering angle deviation ΔSTR is not increasingly corrected. However, the magnitude of the steering angle deviation ΔSTR may be increasingly corrected so as to achieving an equivalent reduction correction so that the threshold value ThUS becomes a value necessary for preventing erroneous determination of an understeer state.

Furthermore, the control of the above-described first and second embodiments may be executed in combination. In that case, however, the increase correction amount of the threshold value ThUS is made smaller than in the first embodiment, and the reduction correction amount of the magnitude of the steering angle deviation ΔSIR is made smaller than in the second embodiment.

What is claimed is:

1. A behavior control apparatus for a vehicle, comprising a yaw rate sensor that detects a yaw rate of the vehicle, a steering angle sensor that is provided in a steering device and detects a steering angle, and a control unit configured to control a behavior of the vehicle; the yaw rate sensor and the steering angle sensor each output a positive value for one of the left turning direction and the right turning direction; and the control unit is configured to calculate a steering angle conversion value of a yaw rate based on a yaw rate detected by the yaw rate sensor, and, when it is determined that a magnitude of a deviation between a steering angle detected by the steering angle sensor and a steering angle conversion value exceeds a threshold value and the vehicle is in an understeer state, to control braking/driving forces of wheels so that the magnitude of the deviation decreases, wherein the steering device includes a rack-and-pinion device having a variable gear ratio type rack bar, and has a steering gear ratio that is smaller in a range where a magnitude of the steering angle exceeds a first reference value than in a range where the magnitude of the steering angle is equal to or less than the first reference value, the control unit is configured to obtain a zero point offset amount of the yaw rate sensor and, assuming that the zero point offset amount takes a positive value when a zero point offset of the yaw rate sensor is an offset in the one turning direction, and when the sign of the steering angle is the same as the sign of the offset amount and a magnitude of the zero point offset amount exceeds a second reference value, to correct at least one of the threshold value and the magnitude of the deviation according to the steering angle and the zero point offset amount so that it becomes difficult to determine that the magnitude of the deviation exceeds the threshold value.

2. The behavior control apparatus for a vehicle according to claim 1, wherein the control unit is configured to set a third reference value having a magnitude smaller than the first reference value based on the zero point offset amount for a range of the steering angle having the same sign as the zero point offset amount, and to increasingly correct the threshold value in a range where the magnitude of the steering angle exceeds the third reference value.

3. The behavior control apparatus for a vehicle according to claim 2, wherein the control unit is configured to variably set the third reference value based on the zero point offset amount such that a magnitude of a difference between the first reference value and the third reference value increases as the magnitude of the zero point offset amount increases.

4. The behavior control apparatus for a vehicle according to claim 2, wherein the control unit is configured to increase an increase amount of the threshold value as a magnitude of a difference between the steering angle and the third reference value increases.

5. The behavior control apparatus for a vehicle according to claim 1, wherein the control unit is configured to set a third reference value having a magnitude smaller than the first reference value based on the zero point offset amount for a range of the steering angle having the same sign as the zero point offset amount, and to decreasingly correct the magnitude of the deviation according to the zero point offset amount so that the magnitude of the deviation in a range where the magnitude of the steering angle exceeds the third reference value becomes small.

6. The behavior control apparatus for a vehicle according to claim 5, wherein the control unit is configured to variably set the third reference value based on the zero point offset amount such that the magnitude of the difference between the first and the third reference values increases as the magnitude of the zero point offset amount increases.

7. The behavior control apparatus for a vehicle according to claim 5, wherein the control unit is configured to increase the magnitude of the decrease amount of the magnitude of the deviation as the magnitude of the difference between the steering angle and the third reference value increases.

8. The behavior control apparatus for a vehicle according to claim 3, wherein the control unit is configured to increase an increase amount of the threshold value as a magnitude of a difference between the steering angle and the third reference value increases.

* * * * *